(12) United States Patent
Gillest et al.

(10) Patent No.: US 11,007,562 B2
(45) Date of Patent: May 18, 2021

(54) CAN PRODUCTION TOOL, PROCESS FOR CONTROLLING CAN WEIGHT, COST, AND DIMENSIONS

(71) Applicant: Integrated Packaging Solutions, LLC, Wheat Ridge, CO (US)

(72) Inventors: Kevin Michael Gillest, Frasier, CO (US); Michael W. Calahan, Arvada, CO (US); Kalvis Jaunarajs, Littleton, CO (US); Richard Lord, Westminster, CO (US)

(73) Assignee: INTEGRATED PACKAGING SOLUTIONS, LLC, Wheat Ridge, CO (US)

( * ) Notice: Subject to any disclaimer, the term of this patent is extended or adjusted under 35 U.S.C. 154(b) by 168 days.

(21) Appl. No.: 16/407,759

(22) Filed: May 9, 2019

(65) Prior Publication Data

US 2020/0353529 A1 Nov. 12, 2020

(51) Int. Cl.
| | | |
|---|---|---|
| *B21D 37/20* | (2006.01) | |
| *B21D 51/26* | (2006.01) | |
| *G05B 19/4093* | (2006.01) | |
| *G05B 19/18* | (2006.01) | |
| *G05B 19/401* | (2006.01) | |
| *G05B 19/418* | (2006.01) | |

(52) U.S. Cl.
CPC ............ *B21D 37/20* (2013.01); *B21D 51/26* (2013.01); *G05B 19/188* (2013.01); *G05B 19/401* (2013.01); *G05B 19/40938* (2013.01); *G05B 19/4187* (2013.01); *G05B 2219/32179* (2013.01); *G05B 2219/45137* (2013.01)

(58) Field of Classification Search
None
See application file for complete search history.

(56) References Cited

U.S. PATENT DOCUMENTS

| | | |
|---|---|---|
| 3,735,629 A | 5/1973 | Paramonoff |
| 2010/0095824 A1 | 4/2010 | Laib |
| 2014/0000333 A1 | 1/2014 | Farnham |
| 2015/0128673 A1 | 5/2015 | Calahan et al. |

*Primary Examiner* — Carlos R Ortiz Rodriguez
(74) *Attorney, Agent, or Firm* — Optima Law Group, APC; Craig W. Barber; Thomas E. Jurgensen

(57) ABSTRACT

The present invention teaches a process of measuring and grinding tools in can/cylindrical body production, allowing reduced production downtime, reduced cost and a predictive tool wear capability, which process allows more accurate stocking of tool inventory by means of tracking individual tools in use and providing advanced diagnostics to the tool room. This includes not just out-of-spec alarms from QA but also predictive alarms regarding cans produced by each tool, in-spec can weights and wall thicknesses, information on tool sizes being used in production, tools in inventory, pulled from inventory and other stock balancing information. The invention further teaches a system of equations for prioritizing grinding to maintain optimum tool inventory levels.

4 Claims, 9 Drawing Sheets

Figure 3

| PUNCH (OD) | REDRAW DIE (ID) | IRONING DIE #1 (ID) | IRONING DIE #2 (ID) | IRONING DIE #3 (ID) |
|---|---|---|---|---|
| 2.6030 | 2.6258 | 2.6196 | 2.6149 | 2.6090 |
| 2.6020 | 2.6248 | 2.6186 | 2.6139 | 2.6080 |

| GRIND PRIORITY LEVEL | GRIND PRIORITY NUMBER | PUNCH OD / DIE ID | MAX INVENTORY | MIN INVENTORY | ACTUAL INVENTORY | IN PRODUCTION | DEFICIENCY | POTENTIAL DEFICIENCY | GRIND QUANTITY |
|---|---|---|---|---|---|---|---|---|---|
| 1 | 1 | 2.6184 | 6 | 3 | 2 | 5 | 1 | 3 | 4 |
| 1 | 2 | 2.6196 | 6 | 3 | 1 | 3 | 2 | 2 | 5 |
| 1 | 3 | 2.6186 | 6 | 3 | 1 | 2 | 2 | 1 | 5 |
| 2 | 4 | 2.6192 | 6 | 3 | 0 | 0 | 3 |  | 6 |
| 2 | 5 | 2.6194 | 6 | 3 | 1 | 1 | 2 |  | 5 |
| 3 | 6 | 2.6182 | 6 | 3 | 2 | 2 | 1 |  | 4 |
| 3 | 7 | 2.6176 | 6 | 3 | 2 | 2 | 1 |  | 4 |

Figure 7

ANALOG OF PRIOR ART

CAN PRODUCTION TOOL, PROCESS FOR CONTROLLING CAN WEIGHT, COST, AND DIMENSIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but reserves all copyright rights whatsoever. 37 CFR 1.71(d).

CROSS-REFERENCE TO RELATED APPLICATIONS

N/A

FIELD OF THE INVENTION

This invention relates generally to can making tools, specifically to dies and punches used on body maker machinery, and more specifically to the bodymaker and associated tool pack and procedures for reducing can cost, controlling weight and dimensions of the cans produced, reducing spoilage, reduction of metal, and for rendering manufacturing more reliable and less prone to shut-downs, during re-grinding of the punches and dies or replacement tool packs in the can making process.

STATEMENT REGARDING FEDERALLY FUNDED RESEARCH

This invention was not made under contract with an agency of the US Government, nor by any agency of the US Government.

BACKGROUND OF THE INVENTION

The modern method of making an aluminum can or other cylindrical body utilizes a "bodymaker", a device which through repeated punching of a cup turns the cup into a can, finished except for flanging, coating, etc, and the lid which is a separate entity/unit and which is seamed on later.

Can design starts with the can specifications & requirements, dome & column strength, wall thickness which includes both thin and thick walls. These will dictate metal thickness on incoming material, cup design and then the bodymaker can requirements for punch & domer tooling design along with the die reductions in the bodymaker.

FIG. 9, PRIOR ART, is an older design of bodymaking machine. The reference numerals on FIG. 9 may be ignored as irrelevant to this patent application. The bodymaker must form the aluminum can body in a series of steps, called drawing and ironing. These steps (redrawing, and repetitive ironing) require a series of punches and dies for the various steps, carried out at high speed and yet required to produce a can having a very precise weight/can wall thickness of material. To little material and the can will not meet specifications/requirements, too much material results is a waste of material and thus money left in the can. The weight of the can, for a given size of can, depends greatly on the wall thickness, more so than on minor deviations in diameter of the can. Deviations less than 0.0001" can cause problems, so the tools uses are measured to a high level of accuracy.

The steps may be generalized as follows.

1) The initial punch generally reshapes the cup, however, the can after the redraw is not yet the proper size and shape.

2) The can is then punched through several (for example, three) ironing dies, each of which gradually reduces the wall thickness.

3) The can goes through a QA step of checking wall thickness, can weight, regularity and so on. This step is surprisingly important, very small variations in can wall thickness can cause the cost of 100,000 cans (a fairly small number) to increase by $10 or $20, simply due to using up too much aluminum during the ironing processing.

The process sounds straightforward, but in fact there is an additional element which causes a cascade of potential problems. In particular, the dies and punches wear. As they wear, they change size, and the cans produced on the varying dies and punches then depart from the acceptable weights. During QA, this departure is noted and at that point, production is normally shut down while a new die or punch or both is/are substituted for the worn one. In general, the dies' inner diameter (ID) becomes larger while the punches' outer diameter (OD) becomes smaller during the course of usage, wear, and regrinding.

Worse, in full scale production a die approximately 2 days (or less than 1 million cans). Given that a full set is one punch and three or four dies, if they wear out at random and unrelated intervals there will be five times as many periods when the bodymaker has to be shut down for replacement.

However, a "tool set" of properly matching dies and punches is actually necessary, as the dies are in fact related in size. As shown in FIG. 3, a set of punches and dies must match one another very closely, and furthermore with the change from each die to the next die being a small reduction. Remembering that a variation of 0.0001" can be problematic, this in turn means that the tool set must be an orderly sequence of sizes. As shown in a hypothetical example in FIG. 3 for a 12 oz container, there might be a punch of outer diameter 2.6030 inches, followed by a redraw die of inner diameter 2.6258 inches, and then ironing dies of 2.6196, 2.6149, and 2.6090 inches. The problem is that if the redraw die begins to wear upward in ID and has to be replaced, it must be replaced with one exactly the same size. If the replacement is not the same exact size, then the entire sequence of punches and dies is unusable for production and must be replaced entirely.

Downtime costs money, increases metal used and the cost of the cans or bodies produced. Unnecessary tooling changes costs money and lost productivity. In addition, cans becoming too thin to pass inspection costs money as do cans becoming too thick. One estimate is $0.10 to $0.20 per one thousand cans is wasted due to improper thickness. Since a production line produces several million cans every day, and most facilities have multiple lines going, this money adds up quickly.

Since a typical die is around $100, it is desirable to send the die/punch to the production facility tool shop for regrinding. Even this only allows a given die to be used around half a dozen times, and it introduces another layer of sizing complexity. In particular, the die can only be ground upward in size, so the other dies in the same tool set must also be ground upward to match when they come off the production line. To revert to the previous example, if the redraw die is ground to a new larger diameter by 0.0002" then the rest of the die set must be ground larger as well. This would result in cans/cylindrical bodies of a very slightly larger diameter but still with the requisite wall thickness at the end of production.

An analog to the Prior Art process of production die regrinding is shown in FIG. 8. This process 802 is generally similar to what is used in the can production industry, however, since the various facilities tend to keep their exact operations private, this is labeled an "analog" of prior art. This is not a flow chart, but rather is a diagram showing the flow of tools through the tool room, inventory, grind stock and production line. In particular, grind stock 806 comprises the quantity of used (or new) dies and punches sitting on the shelf of the tool room 804, available for regrinding. Obviously, it is desirable to grind a given die only the minimum amount necessary to fit it back into an orderly sequence in a given tool set, so the tool room may allow a certain amount of grind stock 806 to accumulate, in order to allow more flexibility in keeping matched sets. The machinist will take a selected tool from grind stock 806 to grinder 810, where it is actually reground to the desired size, which the machinist largely estimates based on experience in the industry and in the particular production facility. The tool room staffer then gives the die/punch a size inspection 812 and labels the die with the exact size (down to one ten thousandths of an inch or even less) so that the precise size is instantly known when the punch/die sits in inventory 814. When a replacement tool is needed, the selection 816 is made from the inventory 814, and the tool flows into production 818. Eventually the cans produced (which flow to 820, Quality Assurance), are measured at some point the wear of the tools on a given bodymaker machine causes the cans to deviate, triggering the alert 832 from QA to Production. The line is (presumably) shut down and a new tool, or a new tool set, is installed in the bodymaker.

The used tool/set (which is likely in this case of a set of four dies and a single punch, or a single die, or other odd amounts, for example a single die and four punches might hypothetically be dismounted at the same time), then flows back to the grind inventory 806 at step 826.

Handling of this procedure has in the past required hour to hour ad hoc judgements by experienced machinists in the tool shop. In general, the tool room staff would need to recall, if they knew, what sizes of tool sets are being used on the production line (or more likely, on multiple production lines all operating simultaneously), and then the tool room staff literally looks at the dies sitting on the inventory shelf and guesses what sizes are likely to wear next and need to be replaced promptly. Since the tool room will require a period of time (hours) to regrind dies, there is no economic possibility of doing it "on the fly". It would be better to have the right tool ready, so instead of doing it in response to needs, the machinist simply carries an inventory and tries to stay ahead of the need, based on his/her experience.

There is one very specific item of feedback known: the QA measurement of can weights and wall thicknesses. (See line 832 near the bottom of the chart, from QA back to Production). This information is collected often, and when weights or thicknesses (the two are obviously related) exceed limits, the production line staff are informed that they need to make a change on a given line. However, the tool room finds out about this when the change in dies/punch is made and the replacements disappear from inventory.

On the contrary, it would be preferable to implement a process so that the tool room staff can be proactively aware of the amount of production already carried out through any given die, and the exact tool sizes in production at that moment, as well as immediately receiving QA alarms for out-of-spec cans, and even information about the weight and wall thickness of the cans being produced that are still within spec.

It would also be preferable to implement procedures to allow the tool room to know what grindable stock is available, what sizes are most likely to be required for present production, and to allow the tool room staff to balance this against known inventory levels, thus allowing stock balancing.

SUMMARY OF THE INVENTION

General Summary

This application relates directly to the bodymaker and associated tool pack and improvements made possible by use of the procedures, including but not limited to: reduced downtime for tooling changes, spoilage reduction, improved metal usage with excess metal going into trim and selling as scrap and not going back into the can if not required, reduced time for tool pack changes/installation with readiness of tool packs. In addition this process can also be used for predictive tool wear to exchange tooling before out of specifications conditions happen.

The present invention teaches a process of measuring and grinding tools in can/cylindrical body production, which process allows more accurate stocking of tool inventory by means of tracking individual tools in use and providing advanced diagnostics to the tool room. This includes not just out-of-spec alarms from QA but also predictive alarms regarding cans produced by each tool, in-spec can weights and wall thicknesses, information on tool sizes being used in production, tools in inventory, pulled from inventory and other stock balancing information. The invention further teaches a system of equations for prioritizing grinding to maintain optimum tool inventory levels to increase productivity.

The present invention teaches that the work of selecting a tool and transferring it to production can be informed by a number of factors, including the ongoing, potentially even real time, results found by the QA department for can weight and can wall thickness (and the QA receives can ID s indicating which specific bodymaker machine a can came from). This provides a proactive measure of which dies or punches may be drifting away from optimum (due to wear) prior to the time that the product actually varies from required spcification, that is prior to an out-of-spec alarm. Another piece of "feedback" is the tool production data, which can also be used in tool selection. In addition, when a given tool is removed from inventory, or added to inventory, this helps provide stock balancing information to the production team and tool room as they engage in tool selection.

The present invention furthermore teaches in another embodiment that the work of grinding tools in the tool room may be carried out more advantageously if a grinding schedule is created. By this means, the tool room staff may operate on the basis of numerical standards when making decisions about which tools to remove from the grind stock, grind and return to the inventory of tools. In one aspect, the tools being pulled from the production machinery and returned to the grind stock may be accompanied by information as to exactly which tools they are, and furthermore the tools which are thereafter in use may be known to the grind scheduler. However, available inventory levels of ground, ready, tool stocks provide an even greater advantage of the present invention. By using straightforward equations (presented herein) the machinists in the tool room may objectively prioritize their planned work on the basis of at least: actual number of tools of a given size in tool inventory, preferred maximum and minimum values in inventory, the number of tools of the given size being used in production, and from these values five additional values can then be determined: deficiency, potential deficiency, grind quantity desired, priority level and priority number for that particular grind.

Summary in Reference to Claims

It is therefore another aspect, advantage, objective and embodiment of the invention, in addition to those discussed previously, to provide an improved method of producing cylindrical bodies on a production line having a bodymaker, a tool shop, and a quality assurance station, the improved method comprising the steps of:

providing in such tool shop a grind stock, a tool inventory, and a tool selection station, providing on such bodymaker a first tool set, the first tool set comprising a first plurality of tools including a first tool having a first size;

the tool inventory including a second plurality of tools not being used on such bodymaker;

using the first tool set to redraw and iron a plurality of cylindrical bodies, such production line informing such tool shop of a count of the plurality of cylindrical bodies produced using the first tool;

such quality assurance station measuring a first one of the plurality of cylindrical bodies against a preset threshold of a can wall thickness, informing the tool selection station of the can wall thickness, and notifying both such production line and such tool shop if the first one of the cylindrical bodies exceeded the preset threshold, while the production line returns the first tool of the first tool set to the grind stock and replaces the first tool with a second tool drawn from the tool inventory, the second tool having the first size;

regrinding the first tool.

It is therefore another aspect, advantage, objective and embodiment of the invention, in addition to those discussed previously, to provide an improved method of producing cylindrical bodies on a production line having a bodymaker, a tool shop, and a quality assurance station, the improved method comprising the steps of:

providing in such tool shop a grind stock, a grind scheduling station, and a tool inventory;

providing on such bodymaker a first tool set, the first tool set comprising a first plurality of tools including a first tool having a first size;

the tool inventory including a second plurality of tools not being used on such bodymaker;

using the first tool set to redraw and iron a plurality of cylindrical bodies, such production line informing such tool shop of a count of the plurality of cylindrical bodies produced using the first tool, and informing the grind scheduling station of a set of sizes of the first tool set being used on the bodymaker;

such quality assurance station measuring a first one of the plurality of cylindrical bodies against a preset threshold of a can wall thickness and notifying both such production line and such tool shop if the first one of the cylindrical bodies exceeded the preset threshold, while the production line returns the first tool of the first tool set to the grind stock and replaces the first tool with a second tool drawn from the tool inventory, the second tool having the first size;

the tool inventory informing the grind scheduling station of a number of tools in the tool inventory having the first size;

using the number of tools in the tool inventory having the first size and the count of the plurality of cylindrical bodies produced using the first tool, and the set of sizes of the first tool set, assigning a priority to a task of regrinding the first tool;

regrinding the first tool at a time when the first tool's priority is the highest priority in the regrinding schedule.

It is therefore another aspect, advantage, objective and embodiment of the invention, in addition to those discussed previously, to provide an improved method of producing cylindrical bodies on a production line having a bodymaker, a tool shop, and a quality assurance station, the improved method comprising the steps of:

providing in such tool shop a grind stock, a grind scheduling station, a tool inventory, and a tool selection station, providing on such bodymaker a first tool set, the first tool set comprising a first plurality of tools including a first tool having a first size;

the tool inventory including a second plurality of tools not being used on such bodymaker;

using the first tool set to redraw and iron a plurality of cylindrical bodies, such production line informing such tool shop of a count of the plurality of cylindrical bodies produced using the first tool, and informing the grind scheduling station of a set of sizes of the first tool set being used on the bodymaker;

such quality assurance station measuring a first one of the plurality of cylindrical bodies against a preset threshold of a can wall thickness, informing the tool selection station of the can wall thickness, and notifying both such production line and such tool shop if the first one of the cylindrical bodies exceeded the preset threshold, while the production line returns the first tool of the first tool set to the grind stock and replaces the first tool with a second tool drawn from the tool inventory, the second tool having the first size;

the tool inventory informing the grind scheduling station of a number of tools in the tool inventory having the first size;

using the number of tools in the tool inventory having the first size and the count of the plurality of cylindrical bodies produced using the first tool, and the set of sizes of the first tool set, assigning a priority to a task of regrinding the first tool;

regrinding the first tool at a time when the first tool's priority is the highest priority in the regrinding schedule.

It is therefore another aspect, advantage, objective and embodiment of the invention, in addition to those discussed previously, to provide a process for regrinding of cylindrical body making tools having a diameter, including punches and dies used in can making, in a production facility having a quality assurance station, the process comprising the steps of:

a) providing a tool shop with a grinder, a tool inventory, a grind stock, and a tool selection station, the tool inventory including a first plurality of tools ready for use in the production facility, each tool in the tool inventory having an associated diameter, the grind stock including a second plurality of tools returned from the production facility, each tool in the grind stock having an associated diameter, there being a plurality of associated diameters of tools;

b) setting a minimum $M\wedge$ number of tools for a first associated diameter;

c) setting a maximum $Mv$ number of tools for the first associated diameter;

d) setting a threshold product diameter;

e) measuring a first cylindrical body produced using a first tool in such production facility, and if the first cylindrical body exceeds the threshold product diameter, replacing the first tool in production with a second tool drawn from the tool inventory, the first and second tools having the first associated diameter;

f) returning the first tool to the grind stock;

g) subtracting from $M\wedge$ the number of tools A in the tool inventory having the first associated diameter, thereby deriving a value for a deficiency D;

h) subtracting from Mv the number of tools A in the tool inventory having the first associated diameter, thereby deriving a value for a grind quantity $G_q$;

I) counting the number of tools in production $P_q$ having the first associated diameter, and subtracting from $P_q$ the number of tools A in the tool inventory having the first associated diameter, thereby deriving a value for a potential deficiency $D_p$;

j) when the potential deficiency $D_p$ is greater than zero, assigning a first priority level to the first associated diameter;

k) when the potential deficiency $D_p$ is less than one, and the deficiency D is greater than zero, assigning a second priority level to the first associated diameter;

L) when the potential deficiency $D_p$ is less than one, and the deficiency D is less than one, assigning a third priority level to the first associated diameter;

m) for each member of the plurality of associated diameters, repeating steps b) through L) until each associated diameter has been assigned a respective value of A, $M\wedge$, Mv, $P_q$, D, $G_q$, and $D_p$;

n) comparing the potential deficiency $D_p$ of each member of the plurality of associated diameters assigned the first priority level, and ordering each by potential deficiency $D_p$ from highest to lowest, with the highest receiving a priority number of one, and the second highest receiving a priority number of two, until each member of the plurality of associated diameters assigned the first priority level has been assigned a priority number;

O) continuing to assign priority numbers in the same numerical sequence without starting over, by comparing the deficiency D of each member of the plurality of associated diameters assigned the second priority level, and ordering each by deficiency D from highest to lowest;

p) continuing to assign priority numbers in the same numerical sequence without starting over, by comparing associated diameters of each member of the plurality of associated diameters assigned the third priority level, and ordering each by diameter;

q) selecting from the grind stock a selected tool for regrinding, the selected tool for regrinding having the associated diameter which received the highest priority number;

r) regrinding the selected tool for regrinding;

s) removing the selected tool for regrinding from the grind stock and adding it to the tool inventory; and t) repeating steps g) through s).

BRIEF DESCRIPTION OF THE DRAWINGS

FIG. 3 is a table showing a pair of hypothetical tool sets, both designed to product cans of approximately 2.600 inches diameter or a 12 oz container, producing a thick wall of approximately 0.0060 inches thickness.

FIG. 7 is a table showing prioritization of grinding based upon various factors laid out in the equations taught herein.

INDEX TO REFERENCE NUMERALS

Figure 1:
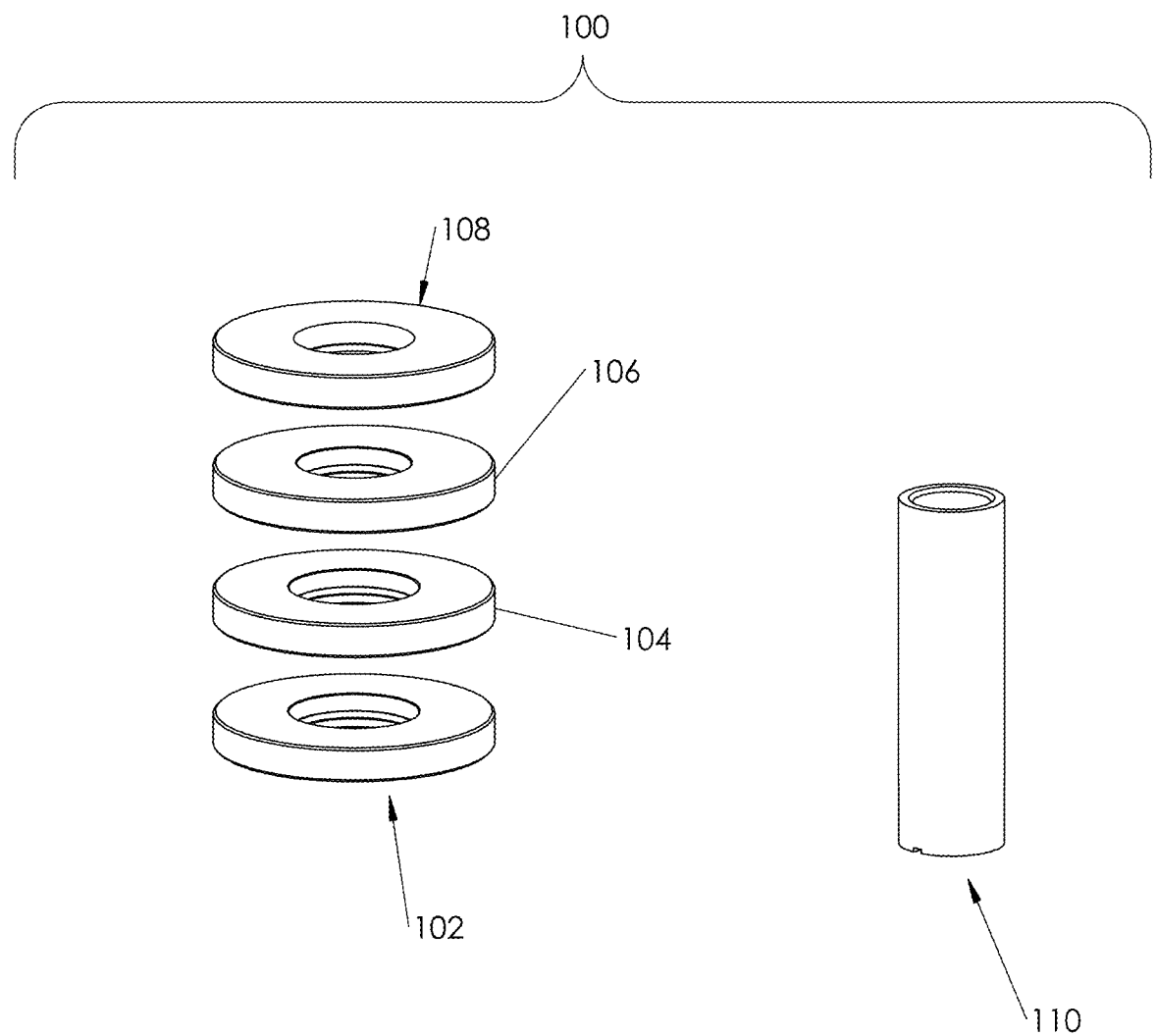
FIG. 1 is a block diagram of a first embodiment of the invention showing a hypothetical tool set of four dies and one punch.
Figure 2:
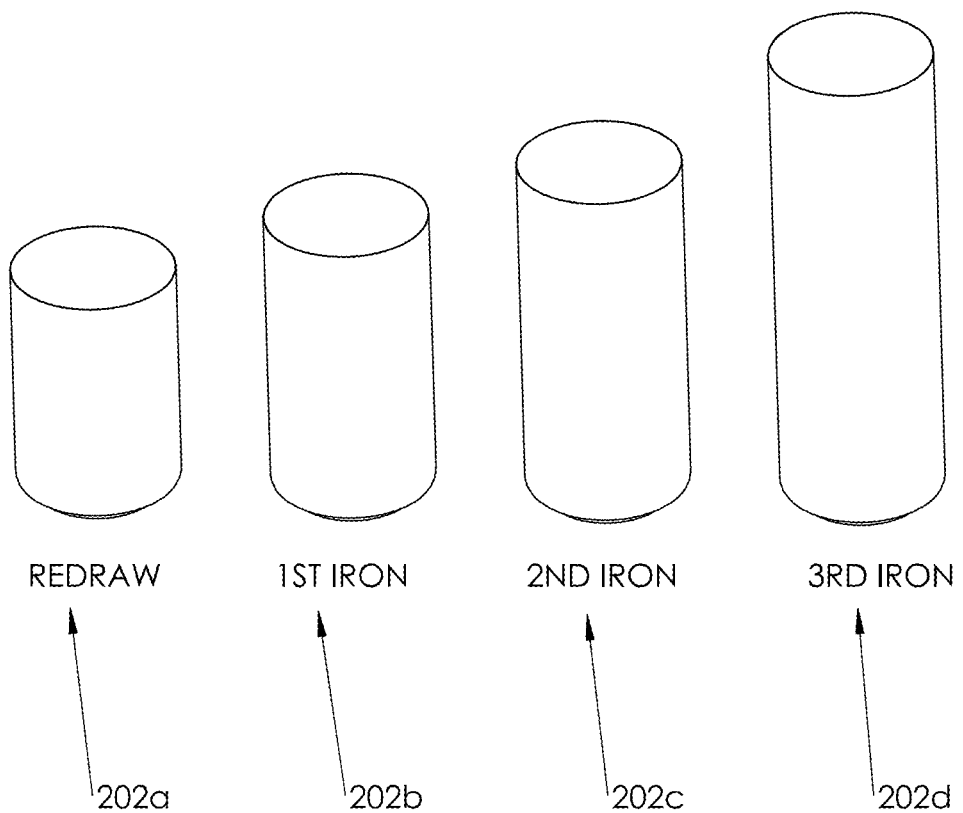
FIG. 2 is a elevational front view of a single cylindrical body in various stages of production in a bodymaker.
Figure 4:
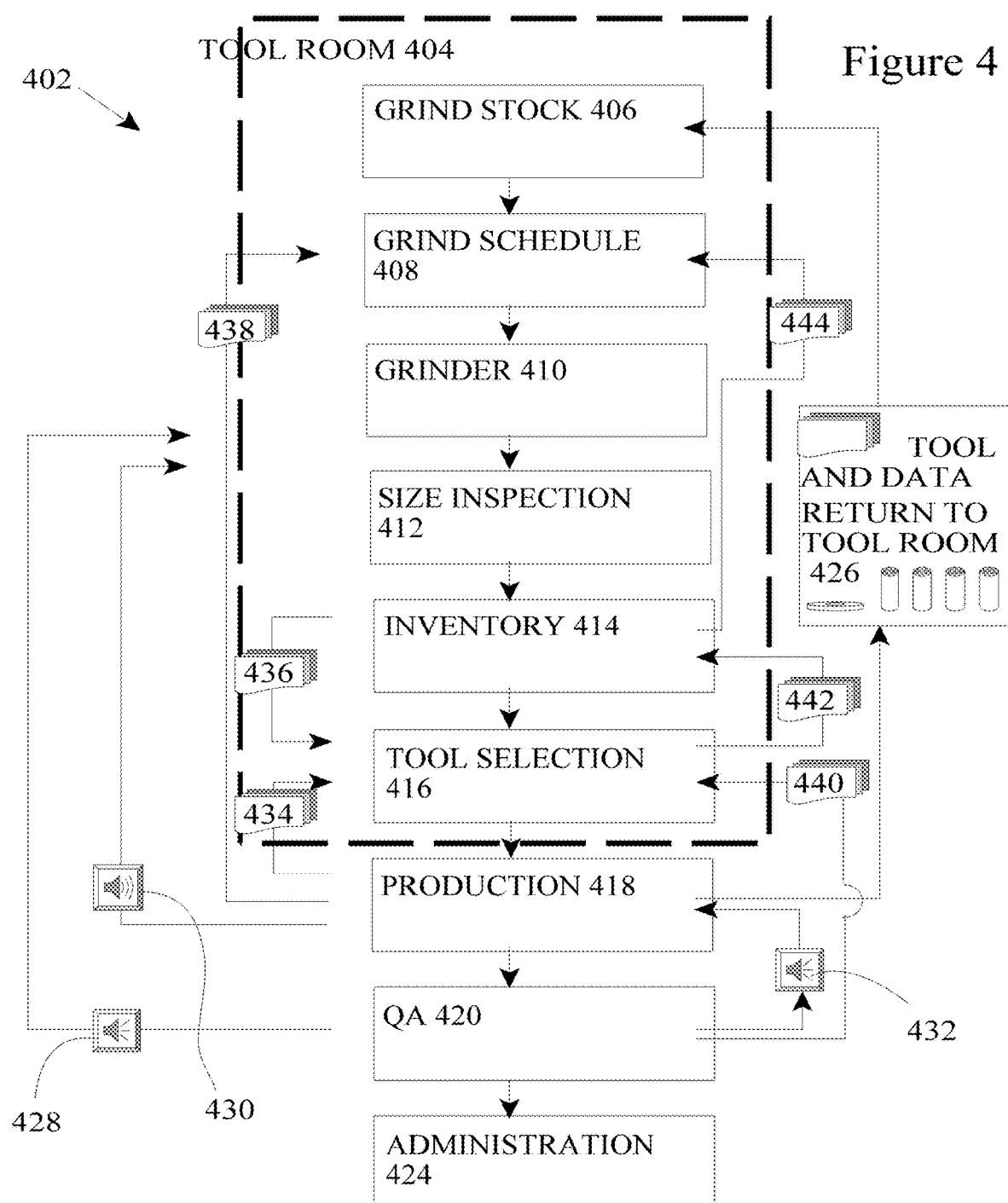
FIG. 4 is a process chart showing four main areas and several sub-areas of a production facility with emphasis on the tool room, and showing the movement of tools (and alarms and information about the tools) as they pass through different parts of the facility. This shows a first embodiment of the invention having both tool selection and scheduling of grinding.
Figure 5:
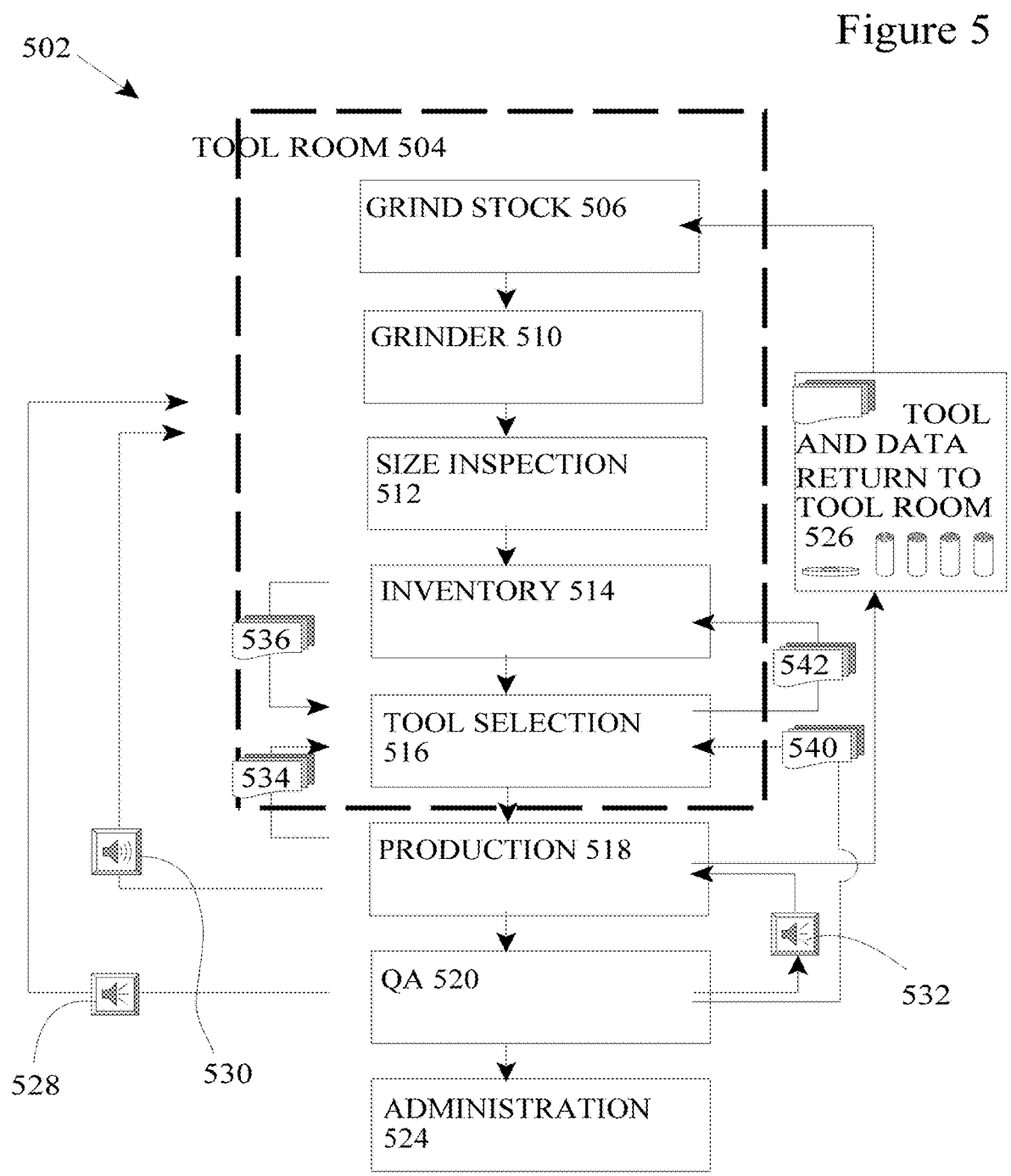
FIG. 5 is a process chart showing a production facility with emphasis on the tool room, and showing the movement of tools (and alarms and information about the tools) as they pass through different parts of the facility in a second embodiment using tool selection.

FIG. 1
Tool set 100
Redraw die 102
Ironing die #1 104
Ironing die #2 106
Ironing die #3 108
Punch 110
FIG. 2
Can/cylindrical body 202a, 202b, 202c, 202d
FIG. 4
Tool use/grind/QA process 402
Tool room 404
Grind stock 406
Grind schedule 408
Grinding station 410
Size inspection 412
Inventory 414
Tool selection 416
Production line 418
Quality assurance 420
Administration 424
Tool and tool data return to tooling 426
Out of spec alarm directly to tooling 428
Predictive alarm/cans per tool 430
Out of spec alarm 432
Tool production level 434
Stock balancing levels 436
Tool sizes in production 438
Can weight/wall thickness measure 440
Tools out of inventory alarm 442
Available inventory levels 444
FIG. 5
Tool use/grind/QA process 502
Tool room 504
Grind stock 506
Grinding 510
Size inspection 512
Inventory 514
Tool selection 516
Production line 518
Quality assurance 520

Figure 6:
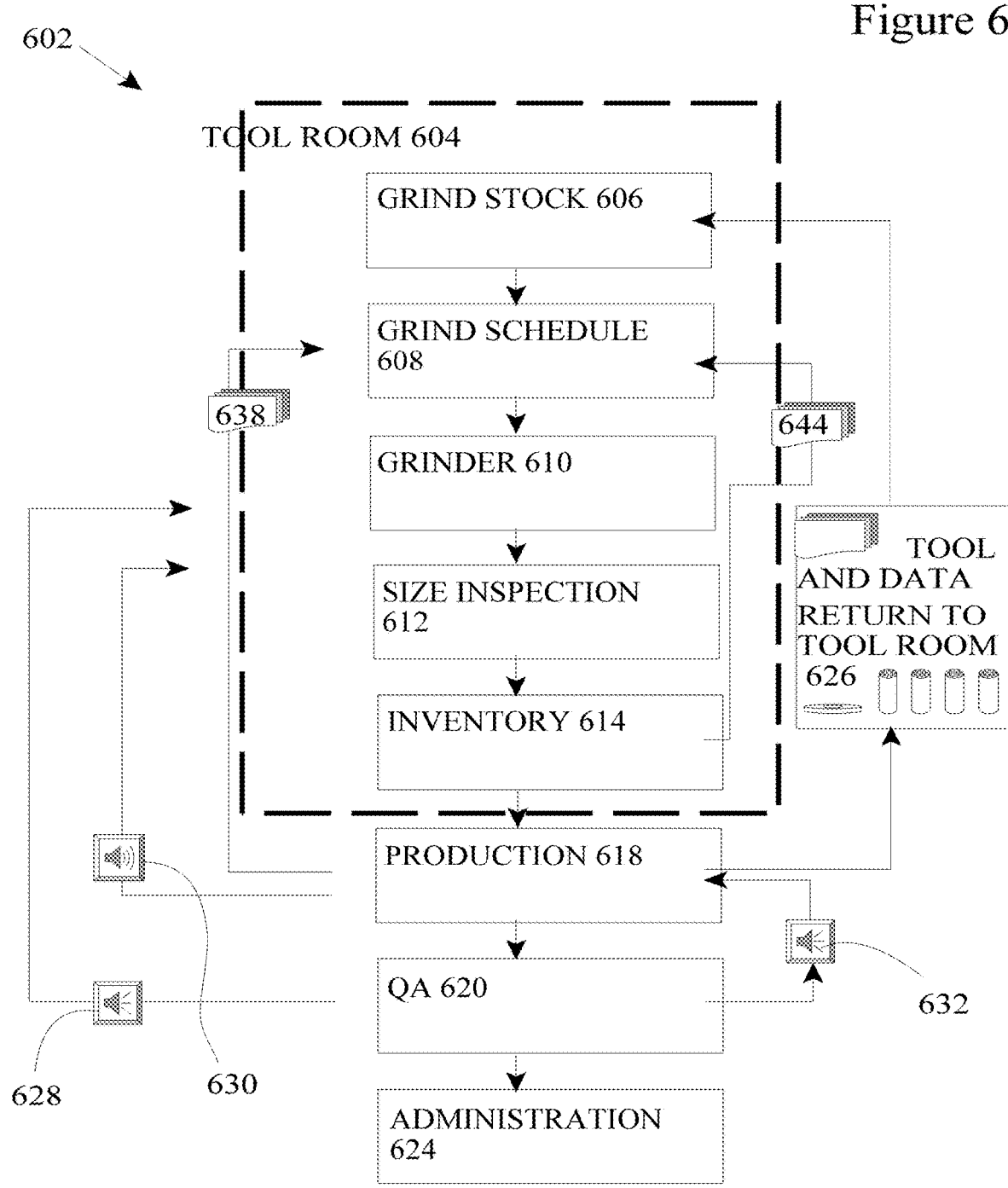
FIG. 6 is a process chart showing a production facility with emphasis on the tool room, and showing the movement of tools (and alarms and information about the tools) as they pass through different parts of the facility in a third embodiment using planned grinding scheduling.
Figure 8:
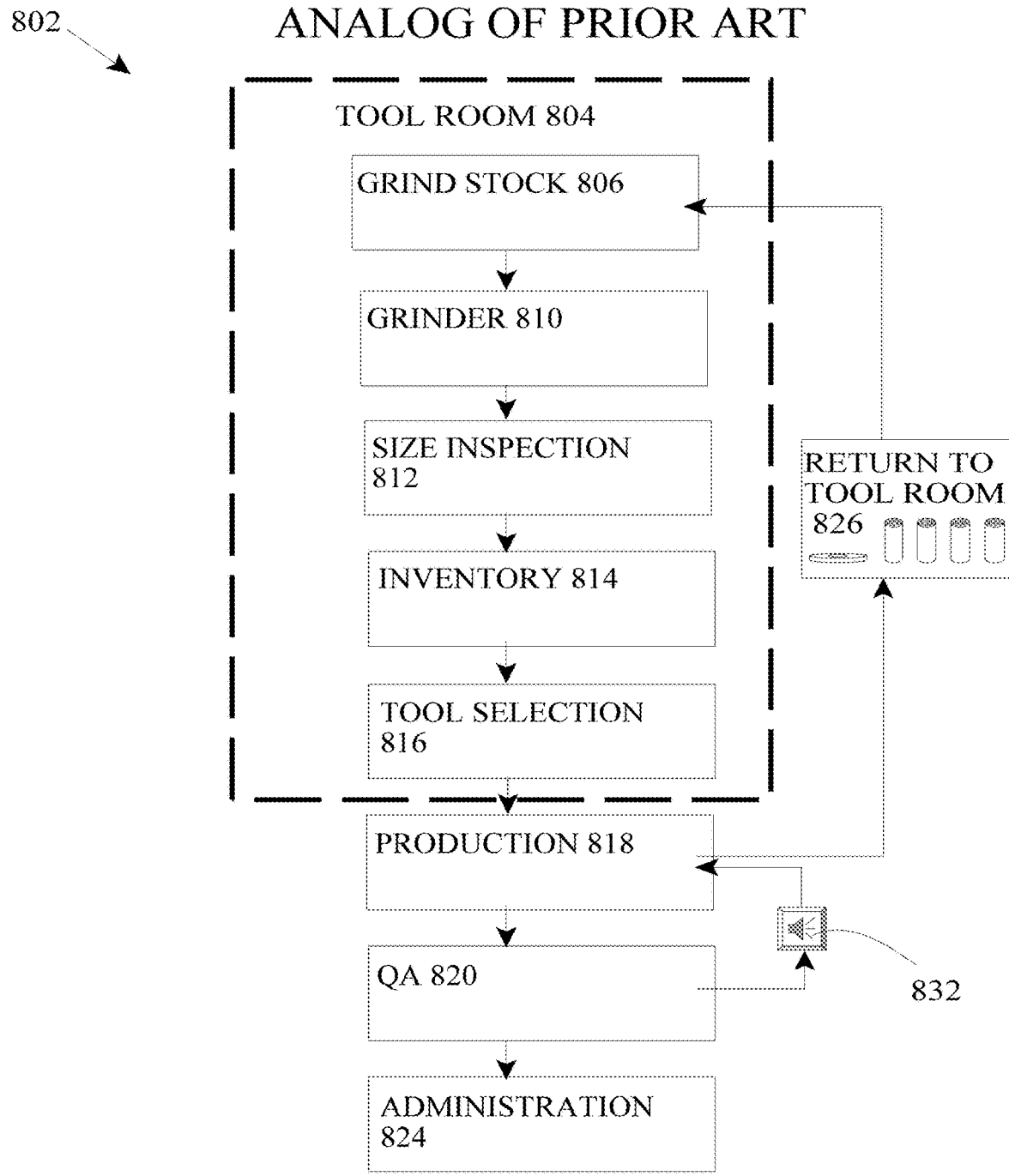
FIG. 8 is an analog example of PRIOR ART processes for tool handling and regrinding as used in present production facilities. This diagram does not represent any particular known process used by the facility.
Figure 9:
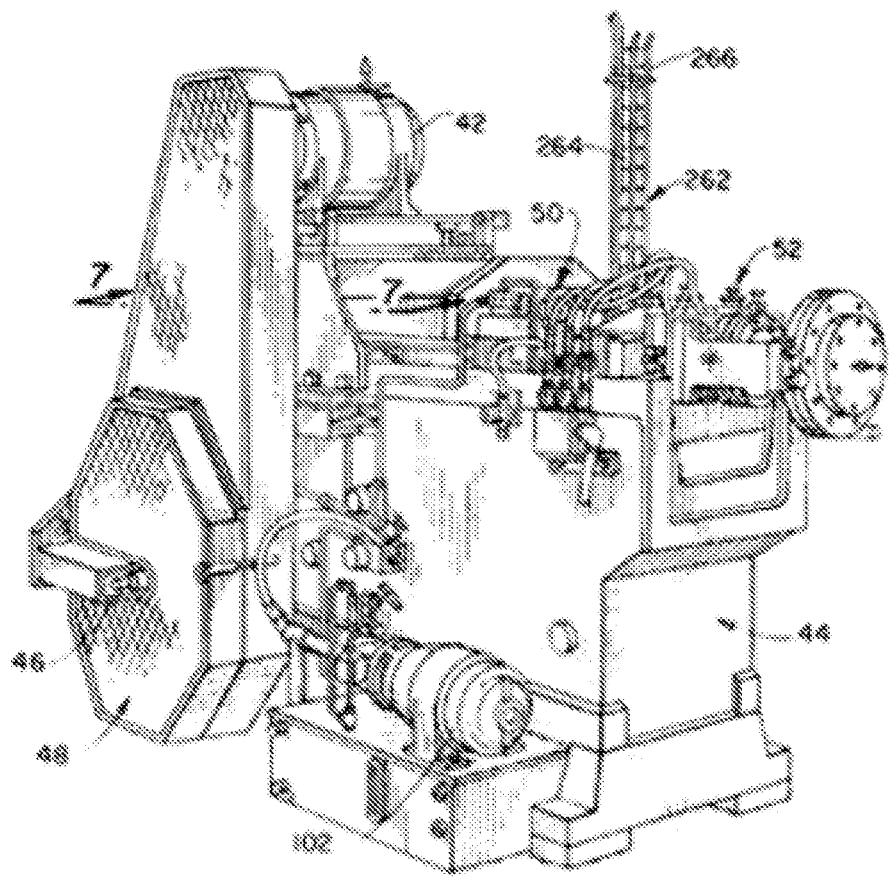
FIG. 9 is a PRIOR ART bodymaker machine from a 1970's era patent.

Administration 524
Tool and tool data return to tooling 526
Out of spec alarm directly to tooling 528
Predictive alarm/cans per tool 530
Out of spec alarm 532
Tool production level 534
Stock balancing levels 536
Can weight/wall thickness measure 540
Tools out of inventory alarm 542
FIG. 6
Tool use/grind/QA process 602
Tool room 604
Grind stock 606
Grind schedule 608
Grinding station 610
Size inspection 612
Inventory 614
Production line 618
Quality assurance 620
Administration 624
Tool and tool data return to tooling 626
Out of spec alarm directly to tooling 628
Predictive alarm/cans per tool 630
Out of spec alarm 632
Tool sizes in production 638
Available inventory levels 644
FIG. 7
Actual inventory A
Minimum M∧
Maximum Mv
Quantity in Production $P_q$
Deficiency D
Grind Quantity $G_q$
Potential Deficiency $D_p$
FIG. 8—ANALOG OF PRIOR ART
Tool use/grind/QA process 802
Tool room 804
Grind stock 806
Grinding machinery 810
Size inspection 812
Inventory 814
Tool selection 816
Production line 818
Quality assurance 820
Administration 824
Tool return to tooling 826
Out of spec alarm 832

DETAILED DESCRIPTION

Glossary

As used herein, the term "grind stock" refers to both the number of worn and new tools which are available for grinding, and also in general to the area of the tool shop where they are stored.

The term "size inspection" refers to making sure that a tool which has been reground is the exact dimension required for a given tool set, and to labeling the new exact size of the tool. This produces an "associated diameter" of the tool: knowing the diameter of the tool is vital to proper production. Since tools come in various sizes, there are in fact a "plurality of associated diameters" in most groups of tools, for example, the different diameters shown in FIG. 3 or FIG. 7.

As used herein, the term "tool" refers to at least one die or punch used in producing cylindrical bodies such as cans.

The term "tool set" refers to a group of dies/punches which are in related sizes (for example as shown in FIG. 3) very close together and which are likely to be used on a single bodymaker at the same time.

The term "tool inventory" or "inventory" or "available inventory levels" refers to the tools on hand, reground and sized and ready to be put into production as needed, and more generally to the area of the tool shop where the tools are stored when ready for production.

The terms "tool shop", "production" (or "production line"), QA or "Quality Assurance", and Administration refer to four major areas of a production facility involved in tool selection, grinding, production of cylindrical bodies and so on.

The terms "can" and "cylindrical body" may be used interchangeably but for purposes of this application the term cylindrical body includes cans, but is not limited to cans, therefore not all cylindrical bodies are cans, and thus the invention may apply to more types of production than just cans. Many consumer goods are sold in cylindrical bodies which are not cans, for example, aluminum bottles and jars for cosmetics, and so on.

The term "tool production level" refers to the sizes and numbers of each size of each type of tool in use for production, for example, "Die #16543 of diameter 3.1005 has run 1,234,567 cycles (or cans produced, strokes, etc) since regrind, Die #08765 of diameter 3.1004 has run 456,789 cycles since regrind, . . . ", as this information is sent to the tool selectors in the tool shop. Also "tool sizes in production" may refer to the sizes of the tools which are in the bodymakers at any given moment, which becomes a notification sent to the grind schedulers in the tool shop.

The term "out of spec alarm" or "out-of-spec alarm" refers to a notification from the QA department to the production facility that cans (measured by wall thickness, or can weight, or other parameters) are not within tolerances/thresholds. These notifications may in the prior art be known to go from QA to production, and in the present invention, may also go directly to the tool shop for the use of the tool shop staff. It is somewhat akin to a real alarm in that it is expected to generate urgent action to return production to acceptable dimensions.

The term "predictive alarm" on the other hand is a notification sent from the production facility to the tool shop of how many cans have been drawn or ironed on a particular tool. This is useful in that the longer a tool has been used in production (measure by cans produced) the more likely it is to need near term replacement. This notification may be real time and frequently updated or policy may dictate that it happen at predetermined thresholds.

Stock balancing levels refers to a fairly subtle use of resources, which shows up as the action of issuing bodymakers certain sizes of tools (that is, a row of a chart such as is pictured below) based on there being a surplus of those size tools in inventory. Consider the consequences if all bodymakers in a factory are running the exact same size of tools: those tools at that size will get used up much quicker, thus leaving inventory levels low at those sizes, and high at other sizes. This unbalanced stock in turn can lead to production disruptions, or the tool shop being forced to hastily regrind a number of tools in that same size again. It would be more efficient if each bodymaker runs a slightly different size, equally spread across the size ranges available. In the real world, bodymakers may not be set up to run a different size equally spread across the size ranges available, so stock balancing addresses this by requiring that bodymaker tool sets be changed entirely (when change is required anyway) to help balance the stock.

Can weight/wall thickness and similar measures indicate if cans are within specification, (that is can walls too thick or too thin). Thickness may be measured by the weight of the can. The term "measurement of wall thickness" may include can weight, since can weight depends on wall thickness and base metal thickness that goes into the can.

"Tools out of inventory" refers to tools selected to be removed from the inventory, which tools are then sent to production for use on the bodymaker, and furthermore, which in the processes of the present invention are no longer available in inventory and thus need to be removed from the records of the inventory. This is important as it changes the actual number in inventory, which may change the deficiency or potential deficiency levels of the tool, which in turn may raise it's priority for regrinding of additional tools of the same type and size.

"Available inventory levels" carries its normal meaning of indicating the number of tools available in inventory and ready to go to production if needed.

"Actual" or "A" as used herein refers to the actual number of tools in inventory.

"Minimum" or "M∧" refers to a minimum level of tools to be held in inventory per policy.

"Maximum" or "Mv" refers to a maximum level of tools to be held in inventory in accordance with policy.

"Quantity in Production" or "$P_q$" refers to the number of tools of a given size which are actually being used in production.

"Deficiency" or "D" refers to not having enough tools on hand in inventory and in production ($P_q$) for both production and the minimum level, or alternatively as the difference between the minimum and the actual, per Equation 1 below.

"Grind Quantity" or "$G_q$" refers to the difference between the maximum and the actual, per Equation 3 below.

"Potential Deficiency" or "$D_p$" refers to the difference between the quantity in production ($P_q$) and the actual, discussed in reference to FIG. 7, Equation 2.

The present method of production allows reduced downtime and reduced production cost by making sure that dies and punches are more readily available and more efficiently prioritized, thus reducing the amount of material consumed, and increasing factory/production line/bodymaker uptime.

End Glossary

FIG. 1 is a block diagram of a first embodiment of the invention showing a hypothetical tool set of four dies and one punch. FIG. 1 shows tool set 100 because the ordering of the sizes of the different tools in the tool set necessarily restricts the options available to the production line/production facility. In particular, redraw die 102, ironing die #1 (104), ironing die #2 (106), and ironing die #3 (108) must be in a closely ordered sequence of sizes as measured by ID, and punch 110, while a different size (and obviously measured by OD) must also match. This is because a can or other cylindrical body is not punched out in a single step operation in a bodymaker. On the contrary, FIG. 2 is a elevational front view of a single cylindrical body in different stages of production in a bodymaker. Redrawn cup/can/cylindrical body 202a, 202b, 202c, 202d is processed in several stages, punched & ironed, and with each iteration becoming more closely aligned with the desired tolerances for can weight (that is, cost of material) and can thickness (the thickness will partially determine the weight). These small changes in can wall thickness require small steps in the sizes of the dies and punches.

FIG. 3 is a table showing a pair of hypothetical tool sets, both designed to product cans of approximately 2.600 inches diameter or 12 oz containers (approx 346 ml). It will immediately be seen that the size differences of the different dies follow an orderly progression without large gaps: 2.6007 ID in the first die becoming 2.6006 in the next, then 2.6005 for the next die and so on.

The second row is for a second tool set with almost, but not quite, identical dimensions.

Thus, a tool MUST be very closely ground to the size of the set being used in the bodymaker. This means that the tool set limits the choices of tools which can be substituted in when one tool is worn down by use and must be replaced, which happens, in high volume production, in a day or two.

FIG. 8 is an analog as an example to PRIOR ART processes for tool handling and regrinding as used in present production facilities. This diagram does not represent any particular patented process used by any particular facility. Tool use/grind/QA process 802 may be considered to start in tool room 804, where a tool is selected, based on operator estimations of need, out of the grind stock 806, from which it goes to the grinding station 810 to be made ready (by regrinding) for reintroduction to the tool inventory of the production line. Regrinding is followed immediately by measurement and inspection (812) and labeling of the tool with it's exact dimensions, so that it will only be used in tool sets in which it fits in proper size sequence. The tool does not go directly into production unless it is immediately required to restart production, instead a tool normally joins the tool inventory 814 and awaits selection 816 to be put into production 818.

Cylindrical bodies produced on the bodymaker on which the tool is in use are measured by tool room personnel 812. In general quality assurance initiates the only rigorous measurement and return sequence. When a threshold for can wall thickness or can weight is crossed, QA 820 informs 832 the production department 818 that there is a problem. At that point production becomes involved and the worn tool is removed from the bodymaker and returned 826 to grind stock 806.

Administration 824 presumably oversees QA information, moves cans, and orders new tool inventory as needed, or as needs are estimated.

FIG. 4 is a process chart showing four main areas and several sub-areas of a production facility with emphasis on the tool room, and showing the movement of tools (and alarms and information about the tools) as they pass through different parts of the facility. This shows a first embodiment of the invention having both tool selection and scheduling of grinding, with the goal of providing a more steady stream of dies and punches in the tool inventory, so that there is never a need to replace more tools then necessary (replacing one tool being quicker than replacing an entire tool set).

In order to do so, it would be helpful for the tool shop staff to have a procedure in place to guide their choices in regrinding dies. FIG. 4 depicts a more complex flow of tools, and notifications from one part of the can factory to another which would make this possible.

Four major parts of the production facility exist: the actual production facility/line itself, the tool shop, the Quality Assurance station, and administration. Note that "station" may refer to a department or a single employee, a work room with specific tools available in it, any useful communication or automation equipment (telephones, computers) and so on. The point of the present invention is not to re-invent the entire production line but to add one station/process (grind scheduling station) and to regrind the tools in a systematic order rather than by experience of the tool shop staff.

Tool use/grind/QA process 402 thus operates on the assumption of a tool room 404, production line 418 and quality assurance 420.

Grind stock 406 will have a plurality of tools awaiting regrinding. The order in which they should be reground however can make the difference between unnecessary production stoppages, carrying an unnecessarily large tool inventory, wasted labor costs and other problems versus optimal production efficiency.

Grind schedule 408 is going to be implemented according to procedures which require an increased degree of cooperation between different stations/departments of the facility, in particular, information which allows creation of the grind schedule, and prioritization of the grind stock on the schedule, based on information from the production line and the QA department.

Grinding machine 410 is the station at which the physical grinding of each tool occurs. Machinists at the grinding station will have access to the grinding schedule, thus freeing them from having to guess about the most likely tool sizes to be needed quickly.

Size inspection 412 simply checks the actual size of each tool as it comes out of the grinding station and labels the tool with the exact dimensions of the tool, in particular, OD for punches and ID for dies. This is mandatory as each tool MUST be used in a set of other tools with sequenced sizes. Thus every tool has an associated diameter, and there are a plurality of associated diameters to be found in the tools in the grind stock, another plurality of associated diameters to be found in the tools of the tool inventory, and yet another plurality of associated diameters to be found in the tools actually being used in production (on bodymakers).

Inventory 414 then receives the dimensioned tools and in contrast to prior art as far as it is known, the addition to inventory of a unit of a given associated diameter is back reported to the grinder scheduling station, which may reduce the priority level or priority number (discussed below in regard to FIG. 7) of that particular size of tool. Also uniquely to the present invention, stock balancing information is forward reported from the inventory to the tool selection station 416.

Tool selection station 416 is in the present invention a more systematic process than in the prior art, as it is informed by information received from production personnel as discussed in relation to the next steps in the invention procedures.

Production line 418 sends cylindrical bodies produced by the bodymakers, using the tools, to quality assurance 420, which measures the products to verify that they are in tolerances/thresholds. However, in the present invention QA 420 does more than just alert production 418 when cans are out of tolerance (step 432). Administration 424 having implemented the present invention, QA 420 will also notify the tool selection station 416 of can weight and wall thickness 440 data, even when the cans are NOT crossing the thresholds and are perfectly acceptable. Furthermore, when QA 420 does alert production 418 of cans which exceed/subceed thresholds, QA 420 will also send the same notification 428 to the tool shop 404, again a step not found in prior art.

In addition, production 418 will notify the tool shop 404 of the actual tool sizes (a plurality of associated tool diameters, along with numbers of tools of each different diameter) being used in production 438, a notification not found in known prior art. In addition, production 418 will even provide predictive, forward-looking information to the tool shop 404 in the form of information as to the number of cans which have been produced by a given tool (step 430). This innovation is useful by allowing the tool shop 404 to see that a given tool has, for example, drawn over one million cans is thus more likely to need replacement. The same information is provided to the tool selection station (step 434).

Stock balancing levels 436 detailing which tool sets, by size, should be used to maintain a balanced use of the various size ranges across the different bodymakers of the facility, are provided by the tool inventory station 414 to the tool selection station 416. The tool selection station 416 will notify the tool inventory 414 when tools are pulled out of the inventory (step 442), and the inventory 414 will in turn notify the grind scheduling 408 of available inventory levels (444).

The tool is then returned to the tool shop grind stock 406 at step 426, but along with the tool itself data on the tool is sent as well (this may be considered two separate steps but for clarity of diagraming is shown as a single step).

The invention may be used in partial forms as well.

FIG. 5 is a process chart showing a production facility with emphasis on the tool room, and showing the movement of tools (and alarms and information about the tools) as they pass through different parts of the facility in a second embodiment using tool selection. FIG. 5 depicts a more complex flow of tools, and notifications from one part of the can factory to another which would make this possible.

Four major parts of the production facility exist: the actual production facility/line itself, the tool shop, the Quality Assurance station, and administration. Note that "station" may refer to a department or a single employee, a work room with specific tools available in it, any useful communication or automation equipment (telephones, computers) and so on.

Grind stock 506 will have a plurality of tools awaiting regrinding. The order in which they should be reground however can make the difference between unnecessary production stoppages, carrying an unnecessarily large tool inventory, wasted labor costs and other problems versus optimal production efficiency.

Grinding machine 510 is the station at which the physical grinding of each tool occurs.

Size inspection 512 simply checks the actual size of each tool as it comes out of the grinding station and labels the tool with the exact dimensions of the tool, in particular, OD for punches and ID for dies. This is mandatory as each tool MUST be used in a set of other tools with sequenced sizes. Also uniquely to the present invention, stock balancing information is forward reported from the inventory to the tool selection station 516.

Tool selection station 516 is in the present invention a more systematic process than in the prior art, as it is informed by information received from production personnel as discussed in relation to the next steps in the invention procedures.

Production line 518 sends cylindrical bodies to quality assurance 520, which measures the products to verify that they are within tolerances/thresholds. However, in the present invention QA 520 does more than just alert production 518 when cans are out of tolerance (step 532). Administration 524 having implemented the present invention, QA 520 will also notify 540 the tool selection station 516 of can weight and wall thickness data, even when the cans are NOT crossing the thresholds and are perfectly acceptable. Furthermore, when QA 520 does alert production 518 of cans which exceed/subceed thresholds, QA 520 will also send the same notification 528 to the tool shop 504, again a step not found in prior art.

In addition, production 518 will even provide predictive, forward-looking information to the tool shop 504 in the form of information as to the number of cans which have been produced by a given tool (step 530). The same information is provided to the tool selection station (step 534).

Stock balancing levels 536 are provided by the tool inventory station 514 to the tool selection station 516. The tool selection station 516 will notify the tool inventory 514 when tools are pulled out of the inventory (step 542).

The tool is then returned to the tool shop grind stock 506 at step 526, but along with the tool itself data on the tool is sent as well (this may be considered two separate steps but for clarity of diagraming is shown as a single step).

FIG. 6 on the other hand is a process chart showing a production facility with emphasis on the tool room 604, and showing the movement of tools 602 (and alarms and information about the tools) as they pass through different parts of the facility in a third embodiment using planned grinding scheduling 608 without the tool selection being anything other than moving to production 618 from inventory 614.

Grind stock 606 is ready for grinding according to grind schedule 608, when an item reaches the highest priority number it goes to the grinder 610, is reground, inspected, sized, associated with size 612 and inventoried 614. Inventory 614 will alert schedule 608 of inventory levels 644.

Production line 618 will send predictive alarms/cans per tool 630 directly to the scheduling department 608, as well as notifications of the associated diameters presently in use in production, 638.

Quality assurance 620 will send out of spec alarms, both the traditional one to production (632) and an innovation, alarms to the tool room, 628, and of course this will cause tool and tool data return to tooling at step 626.

Importantly, with all phases of production and tooling working together, some useful parameters may be invented as well. In particular, FIG. 7 is a table showing prioritization of grinding based upon various factors laid out in the equations taught herein. In particular, a "deficiency", a "potential deficiency" and a "grind quantity" may be now be derived and calculated based on statistics which can be gathered with all departments sharing information as laid out herein.

"A" is the actual number of tools in tool inventory, ready for use in production.

"M/\" is a minimum level of tools to be held in inventory according to policy created by administration, production and tool room with information from quality assurance.

"Mv" then refers to a maximum number of tools to be held in inventory in accordance with a second facility policy.

Finally the quantity of tools being used in production at any moment, or "$P_q$" refers to the number of tools of a given size which are actually being used in production.

Note that for each different size of tool (2.6184, 2.6196, etc. . . . ) each of these numbers is largely independent, so there are in fact a plurality of numbers sets, each one relating to a different one of the plurality of associated diameters of the tools. And since the tools are located in three major places (grind stock, tool inventory, and production) there are in fact three sets of numbers for each size and each location. The grind scheduling staff will need to track a large group of numbers in order to compare and determine what their priorities will be.

Deriving the new metrics is now possible.

"Deficiency" or "D" refers to not having enough tools on hand in inventory 414 and in production ($P_q$) for both production 418 and the minimum level, or alternatively as the difference between the minimum and the actual number of tools, per Equation 1 below.

$$D = M/\backslash - A \qquad \text{EQ. 1}$$

This teaches that when the policy dictates holding in inventory a certain minimum, but there is not a sufficient stock to meet the minimum, then there is a deficiency, for example, a policy minimum of 3 tools of size 2.6184 (first line of FIG. 7) but there are actually only 2 tools in inventory, meaning that there is a deficiency of 1 tool.

However, in practice it has been found that this is NOT the highest priority metric, and additional work is required.

In particular, tool sizes actually being used in production, and weighted for the number of each size in use in the production line 418, have been found to be nearly critical. This represents a near term potential deficiency or "$D_p$" and is calculated to be the difference between the quantity in production ($P_q$) and the actual number in tool inventory 414.

$$D_p = P_q - A \qquad \text{EQ. 2}$$

This high priority metric turns out to be important in a short term basis, and becomes the foundation of a system of not just numbering the tool sizes in order of priority (see FIG. 7, with tool size 2.6182 the priority number 1) but also for creating priority levels. Thus, item sizes (associated diameters) which have a positive potential deficiency $D_p$ fall into the highest priority level, regardless of the size of their deficiency D, and all such associated diameters should be handled first, in order from the largest $D_p$ to the smallest.

Items having a deficiency D, but no $D_p$, then become the second level of priority, and after the first level items, the second level items are handled in order from largest to smallest D value.

As a third priority, items can be handled from largest to smallest diameters, or other rules may be derived and employed.

The number of items to grind is of importance as well. Assuming that the tool room finds it easiest to grind a single size of tool repetitively, rather than adjust equipment such as grinders to a different size after each tool, a run of multiple tool grindings may be carried out. In this event, the "Grind Quantity" or "$G_q$" refers to the difference between the maximum number to hold in inventory and the actual number in inventory, per Equation 3 below.

$$G_q = Mv - A$$

On the other hand, in other embodiments the $G_q$ may be ignored in favor of updating the grind schedule after each tool is ground, sent to inventory, returned from production, etc etc. In such embodiments, the calculations may be redone after each individual change in tool availability data.

Parts of this process might be automated, or at least partially automated: alarms, transfers of information and so on may be carried out by use of programmable computers having on non-volatile memory programming ordering them to carry out parts of these tasks, for example spreadsheets, automated QA measurements or other parts.

The disclosure is provided to render practicable the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

Methods and components are described herein. However, methods and components similar or equivalent to those described herein can be also used to obtain variations of the present invention. The materials, articles, components, methods, and examples are illustrative only and not intended to be limiting.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples. It is intended that the specification and examples be considered as exemplary only, with a true scope and spirit of the invention being indicated by the following claims.

What is claimed is:

1. An improved method of producing cylindrical bodies on a production line having a bodymaker, a tool shop, and a quality assurance station, allowing less production downtime, reduced cost and a predictive tool wear capability, the improved method comprising the steps of:
   providing in such tool shop a grind stock, a tool inventory, and a tool selection station,
   providing on such bodymaker a first tool set, the first tool set comprising a first plurality of tools including a first tool having a first size;
   the tool inventory including a second plurality of tools not being used on such bodymaker;
   using the first tool set to redraw and iron a plurality of cylindrical bodies, such production line informing such tool shop of a count of the plurality of cylindrical bodies produced using the first tool;
   such quality assurance station measuring a first one of the plurality of cylindrical bodies against a preset threshold of a can wall thickness, informing the tool selection station of the can wall thickness, and notifying both such production line and such tool shop if the first one of the cylindrical bodies exceeded the preset threshold, while the production line returns the first tool of the first tool set to the grind stock and replaces the first tool with a second tool drawn from the tool inventory, the second tool having the first size;
   regrinding the first tool.

2. An improved method of producing cylindrical bodies allowing less production downtime, reduced cost and a predictive tool wear capability, on a production line having a bodymaker, a tool shop, and a quality assurance station, the improved method comprising the steps of:
   providing in such tool shop a grind stock, a grind scheduling station, a tool inventory;
   providing on such bodymaker a first tool set, the first tool set comprising a first plurality of tools including a first tool having a first size;
   the tool inventory including a second plurality of tools not being used on such bodymaker;
   using the first tool set to redraw and iron a plurality of cylindrical bodies, such production line informing such tool shop of a count of the plurality of cylindrical bodies produced using the first tool, and informing the grind scheduling station of a set of sizes of the first tool set being used on the bodymaker;
   such quality assurance station measuring a first one of the plurality of cylindrical bodies against a preset threshold of a can wall thickness and notifying both such production line and such tool shop if the first one of the cylindrical bodies exceeded the preset threshold, while the production line returns the first tool of the first tool set to the grind stock and replaces the first tool with a second tool drawn from the tool inventory, the second tool having the first size;
   the tool inventory informing the grind scheduling station of a number of tools in the tool inventory having the first size;
   using the number of tools in the tool inventory having the first size and the count of the plurality of cylindrical bodies produced using the first tool, and the set of sizes of the first tool set, assigning a priority to a task of regrinding the first tool;
   regrinding the first tool at a time when the first tool's priority is the highest priority in the regrinding schedule.

3. An improved method of producing cylindrical bodies allowing less production downtime, reduced cost and a predictive tool wear capability, on a production line having a bodymaker, a tool shop, and a quality assurance station, reducing production line downtime and production cost, the improved method comprising the steps of:
   providing in such tool shop a grind stock, a grind scheduling station, a tool inventory, and a tool selection station,
   providing on such bodymaker a first tool set, the first tool set comprising a first plurality of tools including a first tool having a first size;
   the tool inventory including a second plurality of tools not being used on such bodymaker;
   using the first tool set to redraw and iron a plurality of cylindrical bodies, such production line informing such tool shop of a count of the plurality of cylindrical bodies produced using the first tool, and informing the grind scheduling station of a set of sizes of the first tool set being used on the bodymaker;
   such quality assurance station measuring a first one of the plurality of cylindrical bodies against a preset threshold of a can wall thickness, informing the tool selection station of the can wall thickness, and notifying both such production line and such tool shop if the first one of the cylindrical bodies exceeded the preset threshold, while the production line returns the first tool of the first tool set to the grind stock and replaces the first tool with a second tool drawn from the tool inventory, the second tool having the first size;
   the tool inventory informing the grind scheduling station of a number of tools in the tool inventory having the first size;
   using the number of tools in the tool inventory having the first size and the count of the plurality of cylindrical bodies produced using the first tool, and the set of sizes of the first tool set, assigning a priority to a task of regrinding the first tool;

regrinding the first tool at a time when the first tool's priority is the highest priority in the regrinding schedule.

4. A process for regrinding of cylindrical body making tools having a diameter, including punches and dies used in can making, allowing less production downtime, reduced cost and a predictive tool wear capability, in a production facility having a quality assurance station, and reducing production line downtime and production cost, the process comprising the steps of:
   a) providing a tool shop with a grinder, a tool inventory, a grind stock, and a tool selection station, the tool inventory including a first plurality of tools ready for use in the production facility, each tool in the tool inventory having an associated diameter, the grind stock including a second plurality of tools returned from the production facility, each tool in the grind stock having an associated diameter, there being a plurality of associated diameters of tools;
   b) setting a minimum M/\ number of tools for a first associated diameter;
   c) setting a maximum Mv number of tools for the first associated diameter;
   d) setting a threshold product diameter;
   e) measuring a first cylindrical body produced using a first tool in such production facility, and if the first cylindrical body exceeds the threshold product diameter, replacing the first tool in production with a second tool drawn from the tool inventory, the first and second tools having the first associated diameter;
   f) returning the first tool to the grind stock;
   g) subtracting from M/\ the number of tools A in the tool inventory having the first associated diameter, thereby deriving a value for a deficiency D;
   h) subtracting from Mv the number of tools A in the tool inventory having the first associated diameter, thereby deriving a value for a grind quantity $G_q$,
   I) counting the number of tools in production $P_q$ having the first associated diameter, and subtracting from $P_q$ the number of tools A in the tool inventory having the first associated diameter, thereby deriving a value for a potential deficiency $D_p$;
   j) when the potential deficiency $D_p$ is greater than zero, assigning a first priority level to the first associated diameter;
   k) when the potential deficiency $D_p$ is less than one, and the deficiency D is greater than zero, assigning a second priority level to the first associated diameter;
   L) when the potential deficiency $D_p$ is less than one, and the deficiency D is less than one, assigning a third priority level to the first associated diameter;
   m) for each member of the plurality of associated diameters, repeating steps b) through L) until each associated diameter has been assigned a respective value of A, M/\, Mv, $P_q$, D, $G_q$, and $D_p$;
   n) comparing the potential deficiency $D_p$ of each member of the plurality of associated diameters assigned the first priority level, and ordering each by potential deficiency $D_p$ from highest to lowest, with the highest receiving a priority number of one, and the second highest receiving a priority number of two, until each member of the plurality of associated diameters assigned the first priority level has been assigned a priority number;
   O) continuing to assign priority numbers in the same numerical sequence without starting over, by comparing the deficiency D of each member of the plurality of associated diameters assigned the second priority level, and ordering each by deficiency D from highest to lowest;
   p) continuing to assign priority numbers in the same numerical sequence without starting over, by comparing associated diameters of each member of the plurality of associated diameters assigned the third priority level, and ordering each by diameter;
   q) selecting from the grind stock a selected tool for regrinding, the selected tool for regrinding having the associated diameter which received the highest priority number;
   r) regrinding the selected tool for regrinding;
   s) removing the selected tool for regrinding from the grind stock and adding it to the tool inventory; and
   t) repeating steps g) through s).

\* \* \* \* \*